United States Patent
Inose

(10) Patent No.: US 10,801,597 B2
(45) Date of Patent: Oct. 13, 2020

(54) CAP WITH CLUTCH FOR HELICAL LSD

(71) Applicant: GKN Driveline Japan Ltd, Tochigi, Tochigi (JP)

(72) Inventor: Hideyuki Inose, Tochigi (JP)

(73) Assignee: GKN Automotive Ltd., Birmingham, West Midlands (GB)

( * ) Notice: Subject to any disclaimer, the term of this patent is extended or adjusted under 35 U.S.C. 154(b) by 216 days.

(21) Appl. No.: 16/169,003

(22) Filed: Oct. 24, 2018

(65) Prior Publication Data

US 2019/0056018 A1 Feb. 21, 2019

Related U.S. Application Data

(63) Continuation of application No. PCT/JP2016/066164, filed on Jun. 1, 2016.

(51) Int. Cl.
*F16H 48/24* (2006.01)
*F16H 48/285* (2012.01)
(Continued)

(52) U.S. Cl.
CPC ............. *F16H 48/24* (2013.01); *F16H 48/10* (2013.01); *F16H 48/285* (2013.01); *F16H 48/34* (2013.01);
(Continued)

(58) Field of Classification Search
CPC .... F16H 2048/106; F16H 48/10; F16H 48/24; F16H 48/28; F16H 48/285; F16H 48/30; F16H 48/34
See application file for complete search history.

(56) References Cited

U.S. PATENT DOCUMENTS

| 4,535,651 A | 8/1985 | Chambers |
| 5,749,803 A | 5/1998 | Teraoka et al. |

(Continued)

FOREIGN PATENT DOCUMENTS

| JP | 8-152055 A | 6/1996 |
| JP | H09-79353 A | 3/1997 |

(Continued)

OTHER PUBLICATIONS

International Search Report and Written Opinion for PCT/JP2016/066164 dated Aug. 16, 2016 (7 pages; with English translation).

(Continued)

*Primary Examiner* — Jacob S. Scott
(74) *Attorney, Agent, or Firm* — Bejin Bieneman PLC

(57) ABSTRACT

A cap for a helical LSD is provided with: a clutch member including clutch teeth; a clutch ring including a ring portion including clutch teeth so as to mesh with the clutch member and one or more tab portions projecting radially outwardly from the ring portion; a cap main body fixed on an axial end of the casing; a receding portion of the cap main body receding from a first face toward a second face and being so dimensioned as to receive and allow the clutch ring to be axially movable, the receding portion including one or more dock portions respectively receiving the tab portions; an opening to allow access to the tab portions; side faces of the tab portions and inner faces of the dog portions so that the faces in combination axially press the clutch ring toward the clutch member; and one or more base portions.

4 Claims, 5 Drawing Sheets

(51) Int. Cl.
*F16H 48/10* (2012.01)
*F16H 48/34* (2012.01)
*F16H 48/30* (2012.01)
*F16H 48/42* (2012.01)

(52) U.S. Cl.
CPC ........ *F16H 48/30* (2013.01); *F16H 2048/106* (2013.01); *F16H 2048/423* (2013.01)

(56) References Cited

U.S. PATENT DOCUMENTS

| | | | |
|---|---|---|---|
| 7,572,202 B2* | 8/2009 | Donofrio | B60K 23/04 |
| | | | 192/84.92 |
| 9,022,892 B1* | 5/2015 | Marsh, Jr. | F16H 48/06 |
| | | | 475/228 |
| 2009/0069139 A1 | 3/2009 | Engelmann | |
| 2016/0160981 A1* | 6/2016 | Balenda, II | F16H 48/40 |
| | | | 475/231 |
| 2017/0198801 A1* | 7/2017 | Onitake | F16D 27/108 |

FOREIGN PATENT DOCUMENTS

| | | |
|---|---|---|
| JP | 2004116701 A | 4/2004 |
| JP | 2004225811 A | 8/2004 |

OTHER PUBLICATIONS

Extended European Search Report for EP16904010 dated Dec. 11, 2019 (9 pages).

\* cited by examiner

CAP WITH CLUTCH FOR HELICAL LSD

CROSS-REFERENCE TO RELATED APPLICATIONS

This application is a continuation Application of PCT International Application No. PCT/JP2016/066164 (filed Jun. 1, 2016), the entire contents of which are incorporated herein by reference in their entirety.

BACKGROUND

To transmit torque from a shaft to right and left axles, it is required to use a differential gear in order to allow differential motion between these axles. On the other hand, when one of right and left driving wheels loses its traction, in order to secure torque transmission to the other driving wheel, the differential motion should be limited.

As a differential that automatically limits differential motion, a helical LSD (limited slip differential) has been often used. In a helical LSD, as both planetary gears and sun gears are helical gears, the engagement force acts not only in the radial direction but also in the axial direction. This thrust force presses the respective gears onto the casing to limit rotation thereof, so that the helical LSD torque-sensitively limits its own differential motion. Caps covering both ends thereof must bear the thrust force.

In addition to the automatic differential limitation in the helical LSD, it may be desired to enable external control for limiting or locking up the differential motion. The caps, as they must bear the thrust force as described above, in general get in direct contact with the planetary gears and the sun gears. Thus a structure for lock-up should be additionally placed axially outside the cap or any structure equivalent thereto.

Japanese Patent Application Laid-open No. 2004-225811 discloses a related art.

SUMMARY

The present disclosure relates to a cap with a clutch preferably applicable to a helical limited-slip differential (LSD) for a vehicle and in particular to a cap that in combination with its casing constitutes a clutch for locking up differential motion of a helical LSD. As described above, as a lock-up helical LSD has an additional structure axially outside a cap or any equivalent thereto, it is likely to have a large dimension particularly in its axial direction. To realize a compact structure may cause concern about a strength of any member. The device as disclosed herein has been devised in view of this problem.

A cap, for use with a casing of a helical LSD rotatable about an axis to lock up differential motion, is provided with: a clutch member combinable with any of sun gears of the helical LSD and including clutch teeth; a clutch ring including a ring portion including clutch teeth so as to mesh with the clutch member and one or more tab portions being unitary with and projecting radially outwardly from the ring portion; a cap main body fixed on an axial end of the casing, the cap main body having a first face in contact with the casing and a second face axially opposed to the first face; a receding portion of the cap main body receding from the first face toward the second face and being dimensioned so as to receive and allow the clutch ring to be axially movable, the receding portion including one or more dock portions respectively receiving the tab portions; an opening opened on the second face and in spatial communication with any of the dog portions to allow access to the tab portions; side faces of the tab portions, each of the side faces inclining toward the second face; inner faces of the dog portions inclining toward the first face so as to butt against the side faces in a circumferential direction to axially press the clutch ring toward the clutch member; and one or more base portions each having a shape capable of having axially close contact with the casing in continuity between adjacent dock portions.

DESCRIPTION

Exemplary embodiments will be described hereinafter with reference to the appended drawings.

Throughout the following description and the appended claims, an axis means a rotational axis of a limited-slip differential (LSD) unless otherwise described. Further, while the right and the left may be sometimes discriminated in the following description, this is merely for the convenience of explanation and therefore does not limit embodiments.

Figure 1:
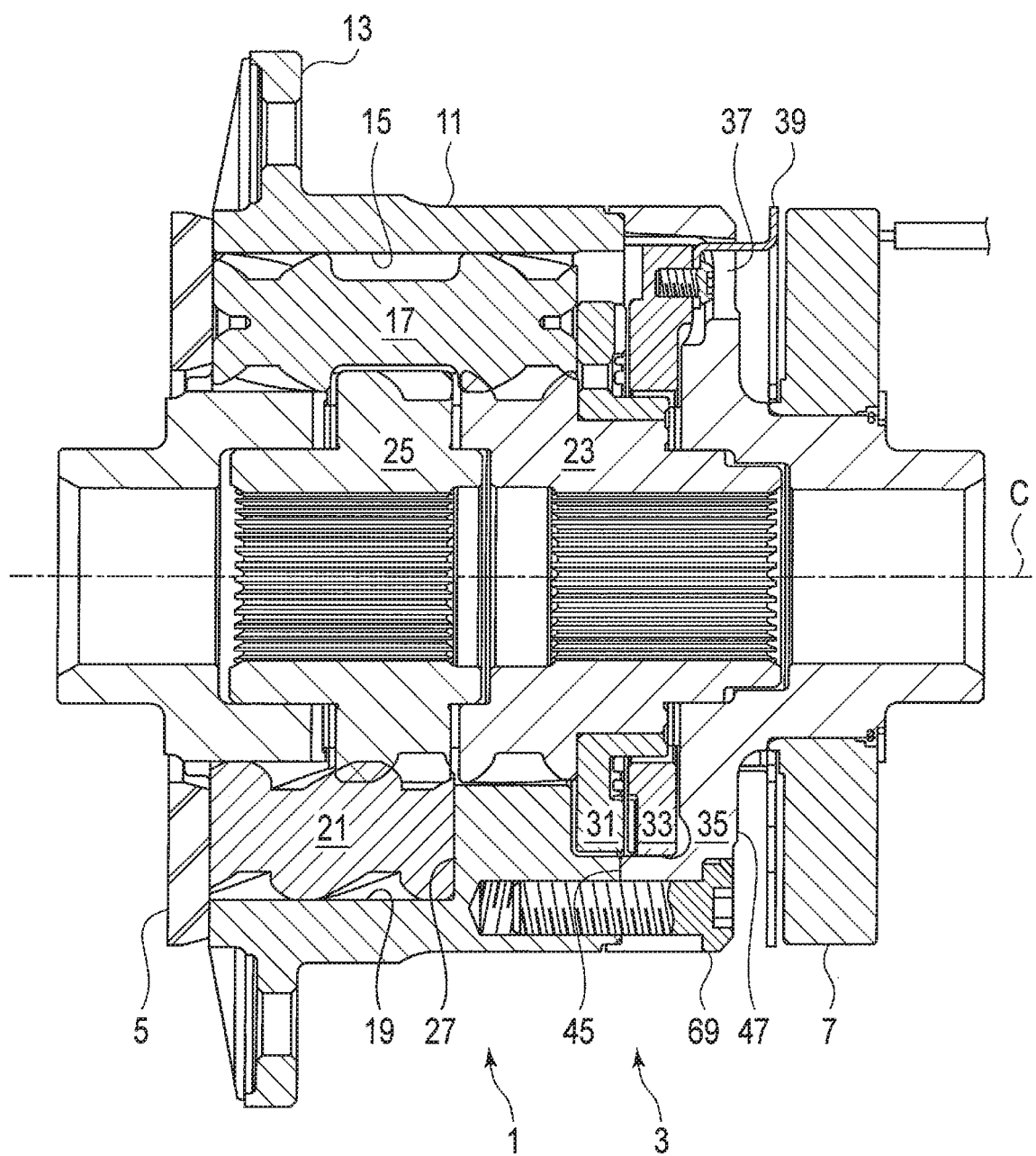
FIG. 1 is a sectional elevational view of a helical LSD and a cap with a clutch according to an embodiment.

Referring to FIG. 1, a helical LSD 1 is a kind of differential gear. The helical LSD 1 is rotatable about an axis C; a cap 3 is combined with an end thereof and an end cap 5 is combined with another end. The caps 3, 5 bear thrust force acting on the planetary gears 17, 21 and the sun gears 23, 25 and meanwhile the cap 3 contains a mechanism for locking differential motion between the sun gears 23, 25. An actuator 7 is a mechanism for driving the locking mechanism.

The helical LSD 1 is in general comprised of a generally cylindrical casing 11, a flange 13 fixedly combined therewith or forming a unitary body therewith, the planetary gears 17, 21 and the sun gears 23, 25 both housed in the casing 11. The flange 13 projects radially outwardly from the casing 11 and receives torque via a ring gear combined therewith, for example, from an engine/motor; thereby, the casing 11 rotates about the axis C.

The casing 11 is provided with a plurality of long bores 15 and a plurality of short bores 19 both running in parallel with the axis C. The long bores 15 can be opened on both ends of the casing 11 but the short bores 19 start from one end adjacent to the end cap 5 and terminate at an end wall 27.

Each long bore 15 houses a long pinion 17 of the planetary gears, and each short bore 19 houses a short pinion 21 likewise. The sun gears 23, 25 are housed around the center of the casing 11. The long pinions 17 and the short pinions 21 are in mesh with each other and are further in mesh with the sun gears 23, 25. The torque is thereby transmitted from the casing 11 through the planetary gears 17, 21 to the sun gears 23, 25, and as well gearing among them enables differential motion between the sun gears 23, 25.

The pinions 17, 21 and the sun gears 23, 25 are all helical gears. Thus, depending on the torque transmitted therethrough, thrust force acts thereon and is borne by the caps 3, 5 fixed to both ends of the casing 11 and the end wall 27 of the casing 11. Further, friction arising from the thrust force limits rotation of the pinions 17, 21, so that the helical LSD 1 torque-sensitively limits differential motion.

The cap 3 is in general comprised of a clutch member 31, a clutch ring 33 and a cap main body 35, and the combination of the clutch member 31 and the clutch ring 33 constitutes a clutch. The clutch member 31 is, by means of splines for example, combined with one of the sun gears 23, and the clutch ring 33, when coupled therewith, locks the sun gear 23 relative to the cap 3, thereby locking up differential motion of the helical LSD 1.

Figure 2:
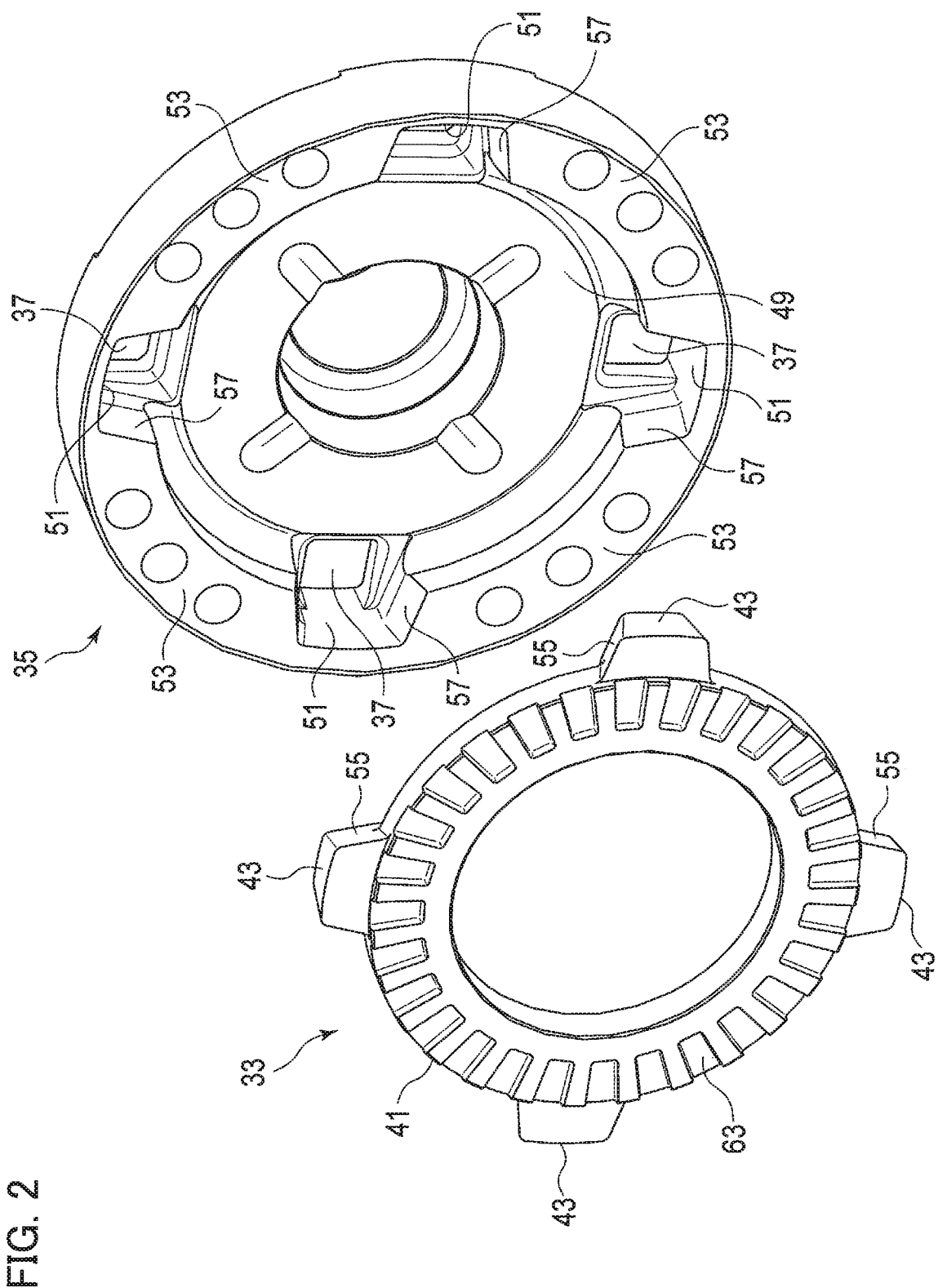
FIG. 2 is an exploded perspective view of a clutch ring and the cap.
Figure 3:
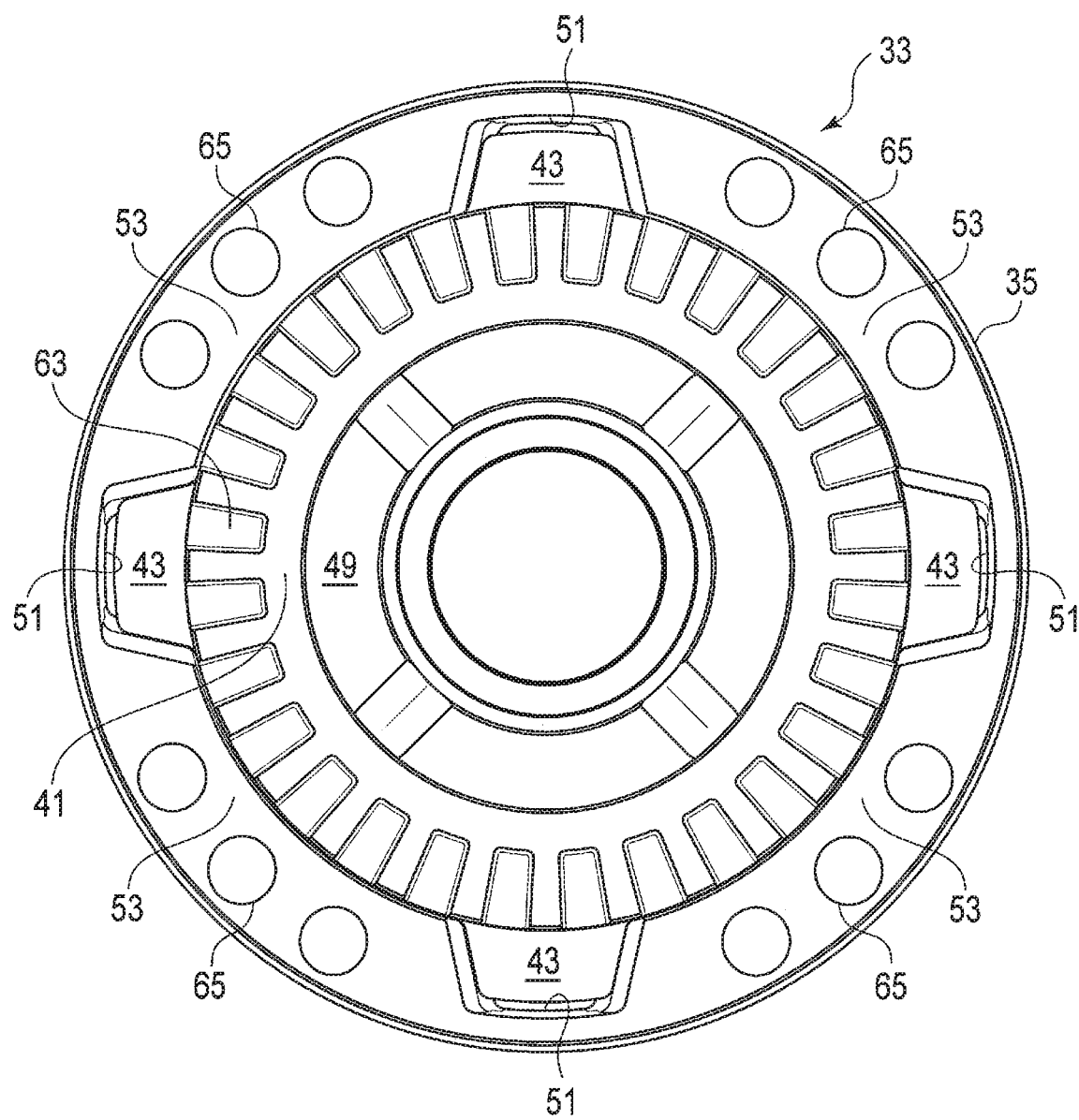
FIG. 3 is an elevational view of the clutch ring and a cap main body, where an inside thereof is viewed in the axial direction.

Referring to FIGS. 2 and 3 in combination with FIG. 1, the clutch ring 33 is comprised of a ring portion 41, the totality of which is generally ring-shaped, and a plurality of tab portions 43 projecting radially outwardly from the ring portion 41. The tab portions 43 are arranged in a rotationally symmetric fashion about the axis C and the number thereof is four, for example, as shown in the drawings. The arrangement and the number of the tab portions 43 may be set to be the same as of the long pinions 17. The totality of the clutch ring 33 may be produced by forging and machining for example.

The whole of the cap main body 35 is shaped like a round pan, which has an inner face (first face) 45 in contact with the casing 11 and an outer face (second face) 47 axially opposed to the inner face, and around the center thereof a receding portion 49 is formed receding from the first face 45 toward the second face 47 so as to receive the clutch ring 33. The recess portion 49 is generally round according to the round shape of the clutch ring 33 and has a plurality of dock portions 51 respectively receiving the tab portions 43. The clutch ring 33 is received in the recess portion 49 and is movable therein along the axis C and yet movable slightly in the circumferential direction.

Figure 4:
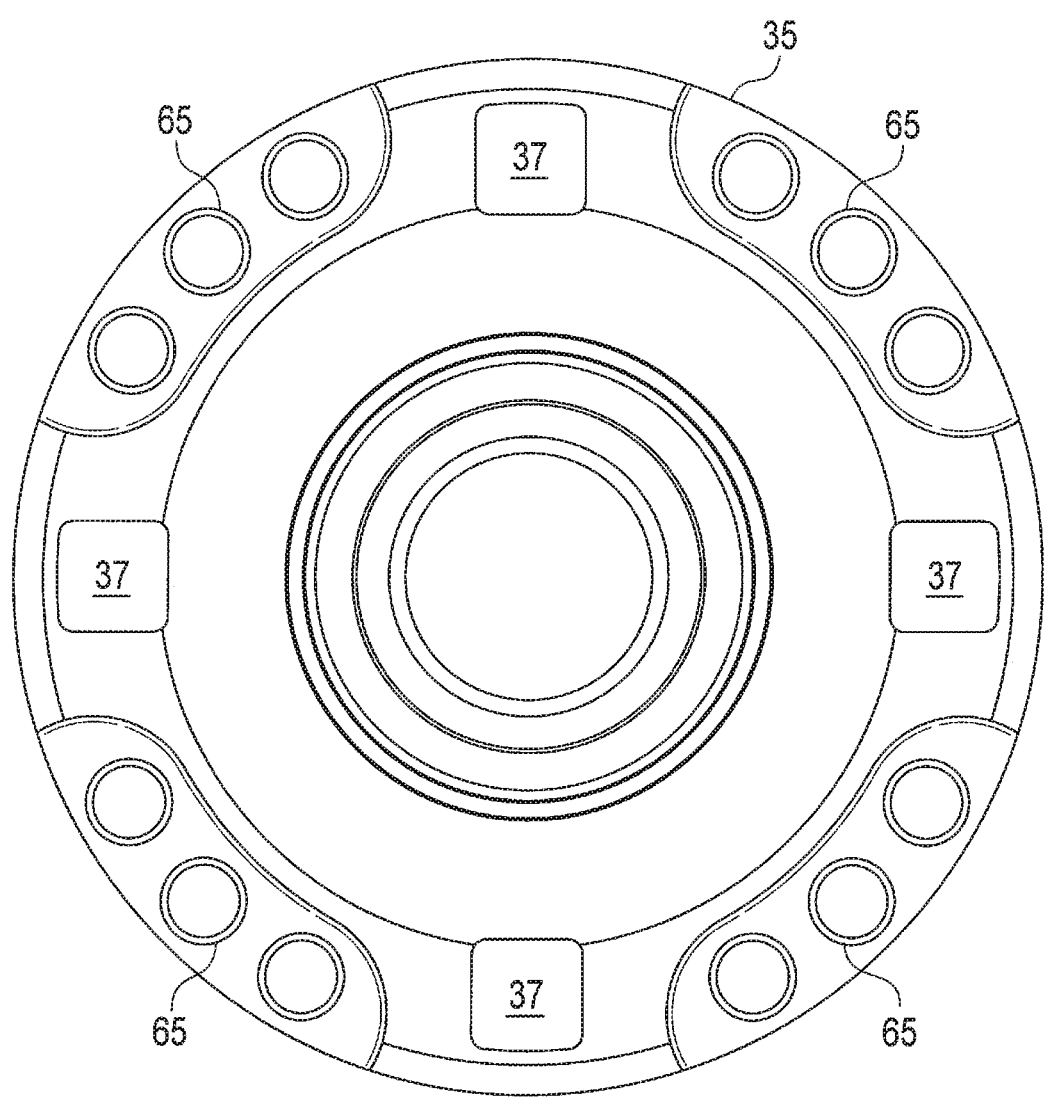
FIG. 4 is an elevational view of the cap, which illustrates an outside thereof.

Further referring to FIG. 4, the cap main body 35 is provided with one or more openings 37 opened on the second face 47. The openings 37 are respectively spatially in communication with the dock portions 51 to allow access from the exterior to the tab portions 43 in the dock portions 51. The openings 37 may be opened toward all the dock portions 51, or alternatively may be limited to some dock portions 51. The plural openings 37 can be rotationally symmetric about the axis C. A pressure plate 39 to be driven by the actuator 7 in the direction of the axis C intrudes through the openings 37 into the dock portions 51 and is there combined with the tab portions 43, so that the actuator 7 is enabled to drive the clutch ring 33.

As best shown in FIG. 2, both side faces 55 of the respective tab portions 43, which extend in a circumferential direction, are not perpendicular to the circumferential directions but inclined toward the cap main body 35. Correspondingly, inner faces 57 of the respective dock portions 51 are not perpendicular to a circumferential direction but inclined toward the first face 45. The combination of these oblique side faces 55 and inner faces 57, when getting contact with each other, constitutes a cam for pressing the clutch ring 33 in the direction of the axis C toward the clutch member 31. The tab 43 may be formed sufficiently thick in the direction of the axis C so as to prevent buckling caused by the load from the pressure force, and the side faces 55 of the tab portions 43 may be formed to be longer in length in the axial direction than the inner faces 57 of the dock portions 51.

As best shown in FIG. 3, while the first face 45 of the cap main body 35 is scooped radially outwardly at the dock portions 51, intervening between adjacent dock portions are base portions 53 that respectively stretch continuously therebetween. Each of the base portions 53 has a shape capable of having axially close contact with the casing 11. The base portions 53 may be provided with through-holes 65 axially penetrating the base portions 53 and are fixed with the casing 11 by means of a plurality of bolts 69 (see FIG. 1). While the base portions 53 bear counter-force by the cam, as they are in continuity in the circumferential direction and, as they are to be integrated with the casing, the base portions 53 effectively prevent the cap main body 35 from deforming or being damaged.

Figure 5:
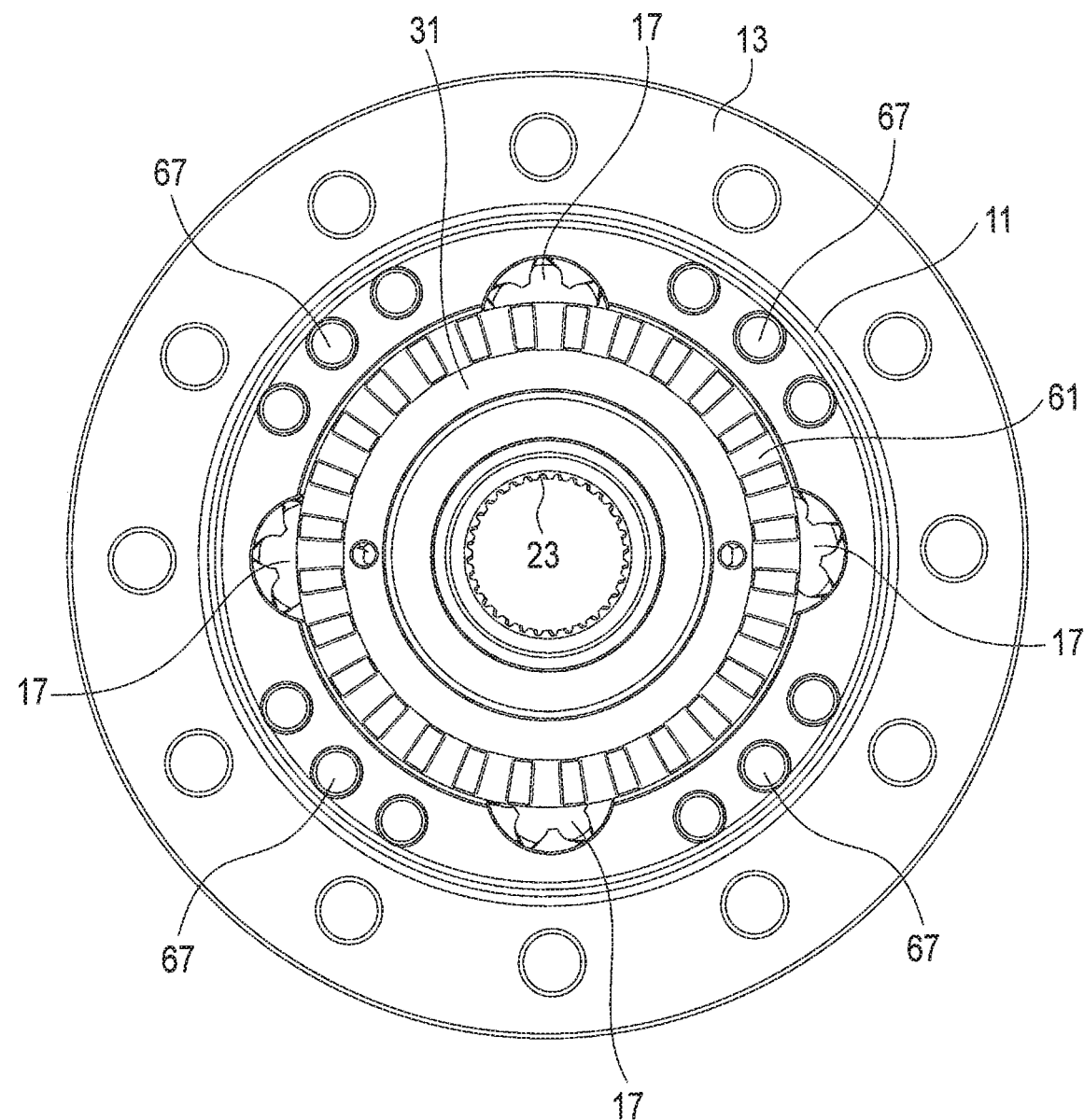
FIG. 5 is an elevational view of the helical LSD, in which the clutch member alone installed therein is viewed in the axial direction.

Referring to FIG. 5, the casing 11 is provided with tap holes 67 corresponding to the through-holes 65 of the cap main body 35, and the long bores 15 respectively housing the long pinions 17 are located between the tap holes 67. Specifically, the locations of the long bores 15 and the long pinions 17 correspond to the locations of the tab portions 43 and the dock portions 51 in the circumferential direction. While the locations of the short bores 19 and the short pinions 21 necessarily overlap the locations of the tap holes 67 and the through-holes 65 in the circumferential direction, as being understood from FIG. 1, the end wall 27 is sufficiently apart from the contact face on the cap main body 35 so that the tap holes 67 do not interfere with the short bores 19. It is unnecessary to dispose the tap holes 67 radially outwardly and therefore the present embodiment is advantageous in size reduction of the helical LSD 1.

Referring again to FIG. 5, the clutch member 31 is, at its internal periphery for example, combinable with the sun gear 23. This coupling may be established by splines for example, or alternatively they may be a unitary body. The clutch member 31, around its outer periphery, may overlap with the long pinions 17 and may thereby bear the thrust force acting on the long pinions 17. Further referring to FIG. 1 in combination, the clutch member 31 is elongated along the bore portion of the sun gear 23 to pass through the internal periphery of the clutch ring 33, thereby getting in contact with the cap main body 35. The clutch member 31 may be directly in contact with the cap main body 35 or alternatively may have any thrust bearing or washer or such interposed therebetween. Specifically, the cap main body 35 can bear the thrust force acting on the long pinions 17 via the clutch member 31.

The clutch member 31 and the clutch ring 33 are provided with mutually engageable clutch teeth 61, 63, thereby constituting the clutch. As the clutch member 31 is combined with the sun gear 23 and the clutch ring 33 engages with the cap 3 by means of the tab portions 43, when the clutch teeth 61, 63 get engaged mutually, the sun gear 23 is locked to the casing 11 and therefore the differential motion of the helical LSD 1 gets locked. A return spring may be interposed between the clutch member 31 and the clutch ring 33, or between the clutch ring 33 and the casing 11, to urge the clutch teeth 61, 63 to be disengaged.

The actuator 7 is, as described already, a means for driving the locking mechanism and is formed of an electromagnet, for example. Alternatively, any hydraulic device, any pneumatic device, a combination of a motor and a cam device or any proper means that produces driving force in the axial direction is applicable to the actuator 7. The actuator 7 may be fixed to a stationary member or slidably fit on the bore portion of the cap main body 35 and be counter-rotated.

According to the present embodiment, when the actuator 7 does not exert driving force on the clutch ring 33, the clutch ring 33 is disengaged from the clutch member 31 and differential motion between the sun gears 23, 25 is enabled. As the actuator 7 presses, via the pressure plate 39, the clutch ring 33 in the direction of the axis C, the clutch teeth 61, 63 get mutually engaged and then the clutch ring 33 is connected to the clutch member 31, thereby locking the differential motion.

Then the side faces 55 of the tab portions 43 butt against the inner faces 57 of the dock portions 51 to convert part of the torque acting on the helical LSD 1 into thrust force, thereby assisting this connection. As the actuator 7 can use this assisting force, the actuator 7 can, without continuing to exert great driving force, preserve the connection between the clutch ring 33 and the clutch member 31.

While relatively great force acts on the side faces 55 of the tab portions 43 and the inner faces 57 of the dock portions 51, it merely creates simple compression or bending stress and does not produce stress concentration. As the tab portions 43 are relatively large in thickness in the principal stress direction and the base portions 53 forming a unitary body with the casing 11 support the internal faces 57 of the dock portions 51, both are prevented from deforming or being damaged. Further, the tab portions 43 are apart from the axis C more than the clutch teeth 63 are, and therefore the force on the tab portions 43 is kept small as being controlled by the principle of leverage even if relatively large force acts on the clutch teeth 63.

As the cam mechanism is used to assist the actuator 7, it becomes unnecessary to use a large-sized actuator and the cam mechanism is by itself compact in the axial direction. Therefore the cap 3 capable of locking the differential motion is notably compact.

As both the clutch member 31 and the clutch ring 33 do not have a structure bulging out in the axial direction, they can be readily produced by forging and machining. Because forging is applicable, any higher-strength material is available and therefore it assures high durability.

As the cap main body 35 also has any structure equivalent to so-called undercuts, it can be produced by forging and machining. It is unnecessary to use any soft material that enables formation of undercuts, and instead any higher-strength material is available. This leads to high durability.

Although certain exemplary embodiments are described above, modifications and variations of the embodiments will occur to those skilled in the art, in light of the above teachings.

INDUSTRIAL APPLICABILITY

A cap applicable to a helical LSD, which has a function of locking differential motion but is compact and highly durable, is provided.

The invention claimed is:

1. A cap for use with a casing of a helical limited slip differential (LSD) rotatable about an axis to lock up differential motion, comprising:
   a clutch member combinable with sun gears of the helical LSD, and including clutch teeth;
   a clutch ring including a ring portion including clutch teeth so as to mesh with the clutch member and one or more tab portions being unitary with and projecting radially outward from the ring portion;
   a cap main body fixed on an axial end of the casing, the cap main body having a first face in contact with the casing and a second face axially opposed to the first face;
   a receding portion of the cap main body receding from the first face toward the second face and being so dimensioned as to receive and allow the clutch ring to be axially movable, the receding portion including one or more dock portions respectively receiving the tab portions;
   an opening opened on the second face and in spatial communication with any of the dock portions to allow access to the tab portions;
   side faces of the tab portions, each of the side faces inclining toward the second face;
   inner faces of the dock portions inclining toward the first face so as to butt against the side faces in a circumferential direction to axially press the clutch ring toward the clutch member; and
   one or more base portions each having a shape capable of having axially close contact with the casing in continuity between adjacent dock portions.

2. The cap of claim 1, wherein the base portions are so disposed as to axially align with short pinions of the helical LSD and each of the base portions comprises one or more bolt holes axially penetrating the base portion from the first face toward the second face.

3. The cap of claim 1, wherein the side faces are longer in axial length than the inner faces.

4. The cap of claim 1, wherein the clutch member is axially elongated to come in contact with the cap main body.

* * * * *